US006912252B2

United States Patent
Emoto et al.

(10) Patent No.: US 6,912,252 B2
(45) Date of Patent: Jun. 28, 2005

(54) DISTRIBUTED COMMUNICATING SYSTEM, DISTRIBUTED COMMUNICATION DATA, DISTRIBUTED TRANSMITTING MEANS AND DISTRIBUTED RECEIVING MEANS

(75) Inventors: Hideaki Emoto, Takasago (JP); Isao Sagawa, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 767 days.

(21) Appl. No.: 09/847,399

(22) Filed: May 3, 2001

(65) Prior Publication Data

US 2001/0038627 A1 Nov. 8, 2001

(30) Foreign Application Priority Data

May 8, 2000 (JP) ........................................ 2000-134117

(51) Int. Cl.[7] .............................. H04B 1/66; H04L 27/20; H04L 27/22
(52) U.S. Cl. ........................ 375/240; 375/295; 375/316; 375/220
(58) Field of Search ................................ 375/219, 220, 375/295, 316, 240, 259, 216, 464–546

(56) References Cited

U.S. PATENT DOCUMENTS

| 4,029,952 | A | * | 6/1977 | Giras et al. | 700/287 |
| 4,267,458 | A | * | 5/1981 | Uram et al. | 290/40 R |
| 4,455,820 | A | * | 6/1984 | Buckley et al. | 60/773 |
| 4,536,126 | A | * | 8/1985 | Reuther | 290/40 R |
| 4,559,828 | A | * | 12/1985 | Liszka | 73/658 |
| 5,680,400 | A |  | 10/1997 | York |  |

FOREIGN PATENT DOCUMENTS

| EP | 1193666 A1 | 4/2002 |
| JP | 58-191979 | 11/1983 |
| JP | 2-224738 | 9/1990 |
| JP | 11-8559 | 1/1999 |
| JP | 11-164142 | 6/1999 |
| WO | 99/59293 | 11/1999 |

OTHER PUBLICATIONS

Doug Stinson, "Visual Cryptography & Threshold Schemes Taking a look at secret sharing", Dr. Dobb's Journal, M&T Publ., Redwood City, CA, US, vol. 23, No. 4, Apr. 1998, pp. 36, 38–43, XP000997109 ISSN: 1044–789X.

Adi Shamir, "How to Share a Secret", Communications of the Association for Computing Machinery, Association for Computing Machinery, New York, US, vol. 22, No. 11, Nov. 1, 1979, pp. 612–613, XP000565227 ISSN: 0001–0782.

* cited by examiner

Primary Examiner—Chieh M. Fan
Assistant Examiner—Jason M. Perilla
(74) Attorney, Agent, or Firm—Wenderoth, Lind & Ponack, L.L.P.

(57) ABSTRACT

Data is transmitted certainly even if some trouble happens on one of the communicating lines and masking effect of the information is enhanced. In the case that data including A, B and C stored in a device at a place transmits to another device 20 located at a different place, communicating lines including at least three lines are connected and divided data portions AB, BC and CA are transmitted through the communicating lines, respectively.

8 Claims, 2 Drawing Sheets

DISTRIBUTED COMMUNICATING SYSTEM, DISTRIBUTED COMMUNICATION DATA, DISTRIBUTED TRANSMITTING MEANS AND DISTRIBUTED RECEIVING MEANS

The entire disclosure of Japanese Patent Application No. 2000-134117 filed on May 8, 2000 including specification, claims, drawings and summary is incorporated herein by reference in its entirety.

BACKGROUND OF THE INVENTION

The invention relates to data transmitting means with high communicating reliability and high masking performance by utilizing a plurality of communicating lines when data is transmitted to a remote place.

Network communication such as a leased line, a telephone communication line and a radio communication line has been used as means for transmitting data stored in a device such as a personal computer and a workstation to a device such as a personal computer of a workstation located at a remote place.

Recently, lines commonly used with third parties such as the Internet are used much more than leased lines.

In the case of communicating with a network, it has often happened that transmitting data was intermitted, caused by troubles on the network such as a shutdown of a communication line and faults of the transmitting device. In the conventional art, in such a case, communication devices are handshaked with each other so as to detect the missing part of the data and retry to transmit the missing part of the data.

However, the devices have to spend a redundant time to handshake and retry in the above described method. Further, the data can not be transmitted if the transmitting line is only a single line and any trouble is still happening on the single line.

On the other hand, in the case of utilizing the lines commonly used with third parties, such as the Internet, it can not be denied that the transmitted data is observed by the third parties. It would be difficult to mask the data.

SUMMARY OF THE INVENTION

To resolve the above disadvantage, a first aspect of a distributed communicating device according to the present invention is characterized by utilizing at least three communication lines and dividing the transmitted data to each communication line in the case of transmitting the data to a device located at a remote place.

To resolve the above disadvantage, a second aspect of the distributed communication device according to the present invention is characterized by dividing data and transmitting the divided data in the distributed communication device so as to recover an optional portion of the divided data even if the optional portion is destroyed.

To resolve the above disadvantage, a third aspect of the distributed communicating device according to the present invention is characterized by not analyzing transmitted data unless the number of divided data is equal or more than a predetermined number, that is, the total divided number minus 1.

DETAILED DESCRIPTION OF THE PREFERRED EMBODIMENTS

Figure 1:
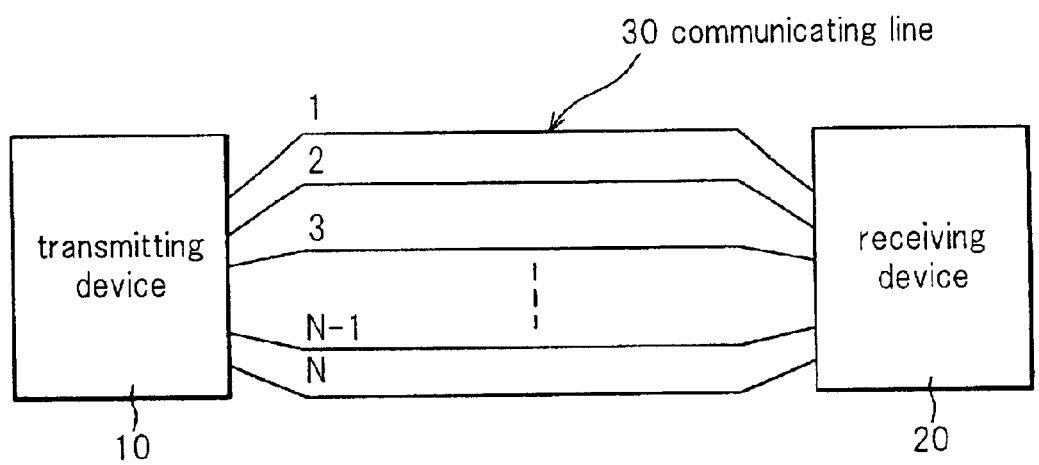
FIG. 1 shows a concept for transmitting data according to the present invention.

As shown in FIG. 1, if data is transmitted from a transmitting device 10 to a receiving device 20 located at a remote place, at least three communicating lines (transmitting paths) 30 are necessary.

In the case that a total number of the communicating lines 30 is N, an inequality of N 3 exists.

In the transmitting device, transmitted data is divided into N parts. A data dividing method is a redundancy distributing method, which has been used in a disk array and so on.

As the redundancy distribution method, there has been known the following method, referred to as "RAID."

One of the methods is a method referred to as "striping", wherein one file is divided into a plurality of parts and the parts are simultaneously written in a plurality of hard discs so as to accomplish high speed file access.

In accordance with the striping method, high speed file access can be accomplished by distributing the operation.

Further, there is also a method referred to as "mirroring" wherein one file is simultaneously written in a plurality of hard discs so as to improve the safety performance of hardware equipment.

In the mirroring method, it means that "back up" is always operated in a spare hard disc. Even if any one of the hard discs is crashed, the crashed data can be recovered by the other hard disc.

In the present invention, at least three communicating lines are utilized by combining the striping method and the mirroring method.

In the case that one data is divided into N parts, even if any one of divided data is destroyed or crashed, original data can be recovered from (N−1) divided portions of the data in a distribution method according to the present invention.

For example, one data is divided into three parts such as regions A, B and C and two regions are selected from the three regions so as to form the divided data portions AB, BC and CA.

In the method, unless at least two divided data portions, that is, (N−1) data divided portions, can be received, the original data can not be analyzed.

Such divided data portions are transmitted to the receiving device 20 through N communication lines 30.

The receiving device 20 receives divided data portions through N communication lines in order to form the original data.

By repeating the operation, the data can be transmitted from the transmitting device 10 to the receiving device 20.

In accordance with the present invention, even if some trouble happens on one of the communicating lines 30 and one of the lines can not transmit any data, the original data can be correctly transmitted.

In the above described case, even if one of the communicating lines meets some trouble and one divided data portion, for example, the divided data portion AB, can not be transmitted through the communicating line, the data consisting the three regions A, B and C can be recovered by the divided data portions BC and CA which can be received by the receiving device 20.

Further, if someone eavesdrops information, two communicating lines 30 out of three communicating lines 30 have to be monitored, so that masking performance with respect to the information can be improved.

In the distributed communicating device according to the present invention, the reliability and the masking performance of the communicating lines can be improved by combining the conventional striping method and the conventional mirroring method.

Similarly, in the case that one data is divided into four regions A, B, C and D, divided data portions, ABC, BCD, CDA and DAB are formed by optionally selecting three regions out of the four regions so as to transmit the divided data portions through four communicating lines, and even if some trouble happens on two communicating lines, the original data can be recovered.

Further, it is possible to divide one data into a lot of regions, A, B, C, D, . . . and select an optional number of the regions from the regions A, B, C and D, . . . so as to transmit the divided and selected data portions through a plurality of communicating lines.

It is necessary to previously determine a data distributed transmitting method between the transmitting device 10 and the receiving device 20.

The transmitting device 10 may code or compress transmitted data and the receiving device 20 may decode or defrost the data.

Although a dividing unit is not restricted, 8bits, 7bits are acceptable and the data may be divided by every one byte.

In addition, one data may be divided into three regions A, B and C. Each divided data A, B and C may be transmitted through three communicating lines, respectively.

In such a case, the original data can be recovered by monitoring all three communicating lines, so that the masking performance with respect to the information can be highly improved.

However, if anyone of the three communicating lines is in fault, the original data can be recovered.

In the case that one data is divided into two parts and the divided data are transmitted through two communicating lines, the masking performance can be improved.

Detailed embodiments according to the present invention will be explained with reference to the accompanying drawings.

[Embodiment 1]

Figure 2:
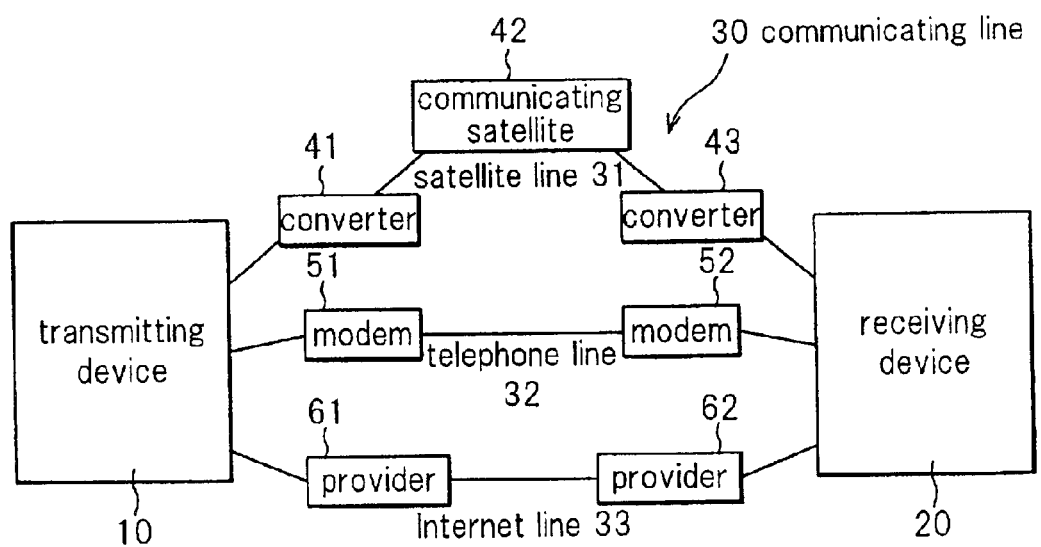
FIG. 2 shows a first embodiment according to the present invention for showing a connecting example of communicating lines.

A distributed communication device of the first embodiment according to the present invention is shown in FIG. 2.

In the first embodiment, different kinds of communication lines are utilized.

As shown in FIG. 2, as a communicating line 30 for transmitting data from a transmitting device 10 to a receiving device 20 located at a remote place, a first line is a satellite line 31, a second line is a telephone line 32 and a third line is an internet line 33.

On the satellite line 31, data from the transmitting device 10 is coded by a converter 41 and transmitted through a communicating satellite 42. At the receiving device 20, the data is decoded by a converter 43.

On the telephone line 32, data is coded by a modem 51 and the coded data is transmitted through a general line. At the receiving device 20, the data is decoded by the modem 52.

On the Internet line 33, data is transmitted through a provider 61. At the receiving device 20, the data is received through another provider 62.

In the embodiment, for example, one data is divided into three regions A, B and C and then two regions are optionally selected from the three regions so as to form divided data portions AB, BC and CA at the transmitting device 10. The divided data portions are transmitted to the receiving device 20 through the satellite line 31, the telephone line 32 and the internet line 33, respectively. The receiving device 20 receives the divided data portions from the three communication lines 30 so as to recover the original data. Such an operation is repeated.

Thereby, one data can be transmitted from the transmitting device 10 to the receiving device 20.

In the first embodiment, even if one of the communicating lines 30 meets some trouble, for example, the telephone line 32 is in fault, the original data can be recovered, since the divided data portions BC and CA are received through the satellite line 31 and the internet line 33 by the receiving device 20.

At least two divided portions out of the three divided portions AB, BC and CA are necessary to analyze the content of the data, so that the masking performance with respect to the information can be improved.

In the first embodiment, the satellite line 31, the telephone line 32 and the Internet line 33 are used as a communicating line 30. However, other kinds of lines are acceptable.

For example, leased lines or LAN (local area network) provided at factories and works, radio communication and lines for CATV (cable television) may be used. Regarding the telephone line 32, ISDN lines are also acceptable, except normal analog lines.

Further, it is acceptable to have a one way communication system from the transmitting device 10 to the receiving device 20 as well as two way communication system.

[Embodiment 2]

Figure 3:
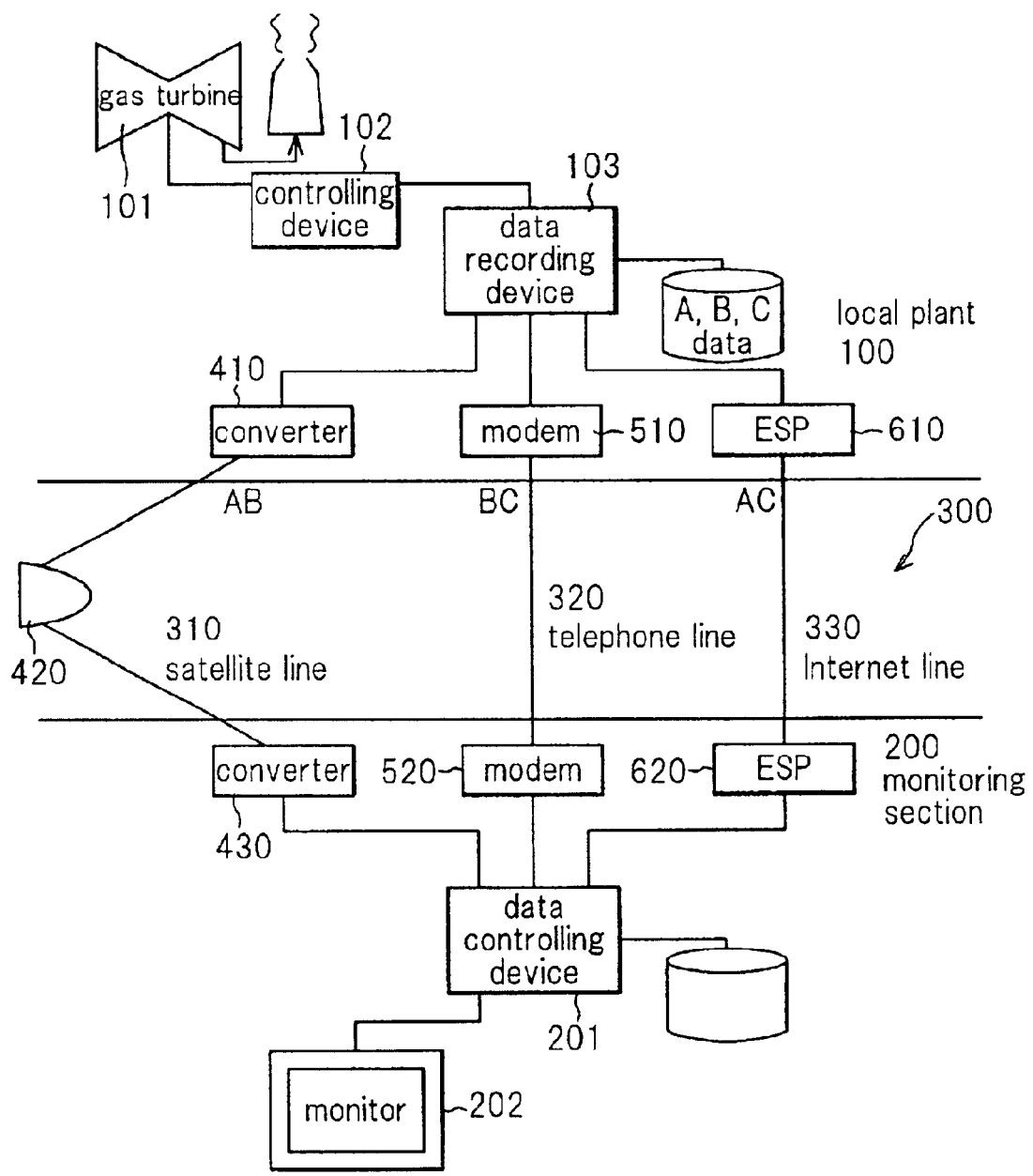
FIG. 3 shows a second embodiment according to the present invention for showing an example of a remote control plant.

A distributed communicating device of a second embodiment according to the present invention is shown in FIG. 3.

The second embodiment is suitable for a remote observation with respect to a plant.

At the plant 100, a gas turbine 101 is controlled by a controlling device 102 and data including control data is recorded by a data recording device 103.

On the other hand, at a monitoring section 200 located at a remote place from the plant 100, a data control device 201 and a monitor 202 are provided. The control data has to be transmitted from the plant 100 to the monitoring section 200.

Thus, the plant 100 and the monitoring section 200 are communicated by a satellite communication line 310, a telephone line 320 and an internet line 330.

On the satellite line 310, data from the plant 100 is coded by a converter 410 and the coded data is transmitted through the satellite line 310 rising satellite 420. At the monitoring section 200, the coded data is decoded by a converter 430.

On the telephone line 320, the data is coded by a modem 510 and the coded data is transmitted through a general line. At the modem 520, the coded data is decoded and transmitted to the monitoring section 200.

On the Internet line 330, the data is transmitted through the provider 610 and the data is received at the monitoring section 200 through the provider 620.

In the second embodiment, the data recording device 103 of the plant 100 divides one data into three regions A, B and C and optionally selects two regions from the three regions so as to form divided data portions AB, BC and CA. The divided data portions are transmitted to the monitoring section 200 through the satellite line 310, the telephone line 320 and the internet line 330, respectively.

At the monitoring section 200, divided data portions transmitted through the three communication lines 300 are received and the original data is recovered by the data controlling device 201. Such an operation is repeated. If necessary, the data is displayed on the monitor 202.

Thus, data such as control data from the local plant 100 can be transmitted to the monitoring section 200.

In the embodiment, even if one of the communicating lines 300 meets some trouble and the data portion can not be transmitted, the data can be correctly transmitted.

In the case of an earthquake occurring and the telephone line 320 being destroyed, the data including the control data can be transmitted from the local plant 100 to the monitoring section 200 if the remaining two lines, that is, the satellite line 310 and the internet line 330, are still in operable condition.

Further, at least two divided data portions out of the divided data portions AB, BC and CA are necessary in order to analyze the content of the data, and the masking performance with respect to the information can be improved.

[The Other Embodiments]

As one embodiment of a distributed communicating device according to the present invention, fixed data such as a text file and still picture data can be transmitted to a remote place.

In another embodiment, moving picture data can be transmitted to a remote place as a remote picture observation device.

Further, the present invention can transmit analysis data such as vibration analysis to a remote place so that the present invention can be utilized as a two way communication between two points (telephone).

The present invention can be utilized to transmit music distribution data such as KARAOKE data through communication lines.

As described above with reference to the embodiments, a feature of a distributed communicating device according to the present invention is to transmit data in a device located at one place to a difference device located at a different place, wherein at least three communicating lines are utilized and one data is divided and transmitted through the corresponding communicating lines, respectively. Therefore, at least two communicating lines have to be monitored so as to recover the original data, and the masking performance with respect to the data can be improved.

That is, a divided data portion for each communicating line is one of the divided data portions, which does not have any important meaning independently. Even if the third party observes/eavesdrops one of the divided data transmitted on a shared line, the original data can not be recovered. The masking performance with respect to the data can be improved.

Another feature of the distributed communicating device is to transmit divided data at the distributed communicating device, wherein the original data can be recovered even if an optional divided data portion is destroyed. If any one of the communicating lines is in fault, the original data can be recovered by the remaining divided data portions. A data transmitting error can thus be avoided even with trouble on the communicating lines.

Another feature of the distributed communicating device according to the present invention is to transmit the divided data portions at the distributed communication device, wherein the data is divided into N divided data portions and the original data can not be analyzed unless at least N-1 divided data portions are received. The masking performance with respect to information can be improved.

The present invention is, of course, in no way restricted to the specific disclosure of the specification and drawings, but also encompasses any modification within the scope of the appended claims.

What is claimed is:

1. A distributed communication device, comprising:

a local plant section comprising a control device operable to control a gas turbine and a data memory device operable to memorize control data of said control device;

a data monitoring section located remotely from said control device, said data monitoring section comprising a data management device and a monitor;

n communicating lines communicating said local plant section with said data monitoring section, where n is a whole number of at least 3;

wherein said local plant section is operable to divide the control data of said control device into n parts, to form n combined data packets each having n−1 parts of said n parts and to transmit said n combined data packets across respective ones of said n communicating lines to said data monitoring section; and wherein said data monitoring section is operable to receive said n combined data packets from said n communicating lines and to reconstruct the control data of said control device; and wherein said n communicating lines comprise at least artifical satellite communication, a telephone cable, and an internet.

2. The device of claim 1, wherein said data monitoring section is operable to reconstruct the control data from only n−1 combined data packets received through respective n−1 communicating lines of said n communicating lines.

3. A distributed communication device, comprising:

a local plant section at a first location comprising a control device operable to control a gas turbine and a data memory device operable to memorize control data of said control device;

a data monitoring section at a second location different from said first location, said data monitoring section comprising a data management device and a monitor;

at least three communicating lines communicating said local plant section with said data monitoring section;

wherein said local plant section is operable to divide the control data of said control device and to transmit the divided control data across respective said at least three communicating lines to said data monitoring section; and wherein said data monitoring section is operable receive the divided data from said at least three communicating lines; and wherein said n communicating lines comprise at least artifical satellite communication, a telephone cable, and an internet.

4. The device of claim 3, wherein said data monitoring section is operable to reconstruct said control data from the divided data received through said at least three communicating lines.

5. A distributed communication device, comprising:

a local plant section at a first location comprising a control device operable to control a gas turbine and a data memory device operable to memorize control data of said control device;

a data monitoring section at a second location different from said first location, said data monitoring section comprising a data management device and a monitor;

at least three communicating lines communicating said local plant section with said data monitoring section;

wherein said local plant section is operable to divide the control data of said control device into at least three portions and to transmit said at least three portions in combinations of an optional number of the at least three portions across respective said at least three communicating lines to said data monitoring section so that if data on one of said at least three communicating lines is destroyed, the control data can be recovered; and wherein said data monitoring section is operable to receive said at least three portions from said at least three communicating lines and to reconstruct said control data of said control device even if one of said at least three portions on one of the said at least three communicating lines is destroyed; and wherein said at least three communicating lines comprise at least artifical satellite communication, a telephone cable, and an internet.

6. A distributed communication device, comprising:

a local plant section at a first location comprising a control device operable to control a gas turbine and a data memory device operable to memorize control data of said control device;

a data monitoring section at a second location different from said first location, said data monitoring section comprising a data management device and a monitor; and at least three communicating said local plant section with said data monitoring section;

wherein said local plant section is operable to divide the control data of said control device into a plurality of parts corresponding to said at least three communicating lines, to combine some of said plurality of parts into respective portions for each of said at least three communicating lines and transmitting the portions across respective said at least three communicating lines; and wherein the control data can be analyzed only if the number of said portions that are received from said at least three communicating lines is at least the total number of said portions transmitted by said local plant section minus one; and wherein said at least three communicating lines comprise at least artificial satellite communication, a telephone cable, and an internet.

7. A transmitter of a distributed communication device, comprising;

a local plant section comprising a control device operable to control a gas turbine and a data memory device operable to memorize control data of said control device;

wherein said local plant section is operable to divide the control data of said control device into n parts, to form n combined data packets each having n−1 parts of said n parts and to transmit said n combined data packets across respective n communicating lines to a target point;

wherein n is at least three; and wherein said n communicating lines comprise at least artificial satellite communication, a telephone cable, and an internet.

8. A receiver of a distributed communication device, comprising:

a data monitoring section located remotely from a control device that is operable to control a gas turbine and a data memory device operable to memorize control data of the control device, said data monitoring section comprising a data management device and a monitor;

wherein said data monitoring section is operable to receive individually transmitted and divided data which has been divided into n parts to form n combined data packets each having n−1 parts of the n parts and transmitted across respective n communicating lines and to reconstruct therefrom the control data of the control device;

wherein n is at least three; and wherein said n communicating lines comprise at least artificial satellite communication, a telephone cable, and an internet.

* * * * *